United States Patent [19]
Okayama et al.

[11] Patent Number: 5,677,971
[45] Date of Patent: Oct. 14, 1997

[54] OPTICAL WAVELENGTH FILTER WITH REDUCED SIDELOBES AND SIMPLE DESIGN

[75] Inventors: Hideaki Okayama; Masao Kobayashi, both of Tokyo, Japan

[73] Assignee: Oki Electric Industry Co., Ltd., Tokyo, Japan

[21] Appl. No.: 517,614

[22] Filed: Aug. 22, 1995

[30] Foreign Application Priority Data

Aug. 26, 1994 [JP] Japan .................................. 6-201805
Oct. 28, 1994 [JP] Japan .................................. 6-265256

[51] Int. Cl.$^6$ ...................................................... G02B 6/00
[52] U.S. Cl. ................................ 385/11; 385/7; 385/9; 385/14; 385/16
[58] Field of Search ........................ 385/11, 7, 9, 14, 385/16, 30, 31, 40, 41

[56] References Cited

U.S. PATENT DOCUMENTS 5,446,807  8/1995  Baran et al. .................... 385/11
5,455,877  10/1995  Baran et al. .................... 385/11

FOREIGN PATENT DOCUMENTS 5-323248  12/1993  Japan.

OTHER PUBLICATIONS

Yamamoto et al, "Supressions of Sidelobe Levels for Guided-Wave Acoustic-Optic Tunable Filters Using Weighted Coupling," IEEE Transactions on Ultrasonics, Ferroelectrics, and Frequency Control, vol. 40, No. 6, Nov. 1993, pp. 814-818.

Kar-Roy et al, "Ultralow Sidelobe-Level Integrated Acoustooptic Tunable Filters Using Tapered-Gap Surface Acoustic Wave Directional Couplers," Journal of Lightwave Technology, vol. 12, No. 6, IEEE, Jun. 1994, pp. 977-981.

Kar-Roy et al, "Integrated Acoustooptic Tunable Filters Using Weighted Coupling," IEEE Journal of Quantum Electronics, vol. 30, No. 7, IEEE, Jul. 1994, pp. 1574-1586.

IEEE Transactions on Ultrasonics, Ferroelectrics, and Frequency Control; vol. 40 No. 6, Nov. 1993, USA, "Suppression of Sidelobe Levels for Guided-Wave Acousto-Optic Tunable Filters Using Weighted Coupling", Y. Yamamoto et al, pp. 814-818.

Applied Physics Letters, vol. 61, No. 9, Aug. 31, 1992, New York, US, D.A. Smith et al, "Sidelobe Suppression in an Acousto-Optic Filter With a Raised-Cosine Interaction Strength", pp. 1025-1027.

Journal of Lightwave Technology, vol. 12, No. 6, Jun. 1994, New York, NY, US, "Ultralow Sidelobe-Level Integrated Acoustooptic Tunable Filters Using Tapered-Gap Surface Acoustic Wave Directional Couplers", Arjun Kar-Roy et al, pp. 977-982.

ECOC '94, 20th European Conference on Optical Communication, Sep. 25-29, 1994, Firenze, Italy, Proceedings, vol. 2, H. Hermann et al, "Tapered Acoustical Directional Couplers for Polarization Independent, Integrated Optical Acoustically Tunable Wavelength Filters/Switches", pp. 763-766.

*Primary Examiner*—Phan T. H. Palmer
*Attorney, Agent, or Firm*—Rabin, Champagne & Lynt, P.C.

[57] ABSTRACT

An optical wavelength filter has a polarizer, an analyzer, and an optical waveguide, formed in a substrate displaying an acousto-optic effect, that guides light from the polarizer to the analyzer. A transducer formed on the substrate excites a surface acoustic wave, thus creating an acoustic beam. The amplitude of the surface acoustic wave is small at the two sides of the acoustic beam and larger in the middle. The optical waveguide enters the acoustic beam at a point on one of the two sides of the beam, then moves into the center of the beam, and exits the beam at another point on one of the two sides.

9 Claims, 8 Drawing Sheets

OPTICAL WAVELENGTH FILTER WITH REDUCED SIDELOBES AND SIMPLE DESIGN

BACKGROUND OF THE INVENTION

The present invention relates to an optical wavelength filter of the acousto-optic type.

A filter of this type has an optical waveguide formed in a substrate, that provides acoustic-optic effects. The effect employed is the conversion of light of a particular wavelength from one mode of propagation to another mode through interaction with a surface acoustic wave (SAW), enabling that particular wavelength to be extracted by means of crossed polarizers placed at opposite ends of the optical waveguide. Filters of this type are useful in wavelength-division multiplexed fiber-optic communication systems.

A common problem of these filters is that their transmission characteristics have unwanted sidelobes, leading to crosstalk in adjacent wavelength channels. It has been found that the sidelobes can be considerably reduced by weighting the acoustic-optic coupling coefficient so that it varies along the length of the optical waveguide. Basically, the coupling coefficient should be small at the ends of the interaction region between the surface acoustic wave and light signal, and rise to a peak in the middle of the interaction region.

A known method of weighting the coupling coefficient in this way is to generate the surface acoustic wave with an interdigital transducer having a curved shape that focuses the surface acoustic wave toward the middle of the interaction region. One problem with this method is that the coupling coefficient for a curved transducer is difficult to calculate, making the filter design difficult to optimize.

Another problem is that in conventional designs the optical waveguide passes under the transducer, where the coupling coefficient varies abruptly. Abrupt variation is itself a source of sidelobes, making it difficult to reduce crosstalk beyond a certain point.

SUMMARY OF THE INVENTION

It is accordingly an object of the present invention to simplify the design of an optical wavelength filter of the acoustic-optic type.

Another object is to improve sidelobe suppression in an optical wavelength filter of the acoustic-optic type.

The invented optical wavelength filter has a polarizer, an analyzer, and an optical waveguide that guides light from the polarizer to the analyzer. The optical waveguide is formed in a substrate providing an acousto-optic effect. A transducer for exciting a surface acoustic wave is formed on the substrate, preferably in a position not overlying the optical waveguide. A SAW waveguide for guiding the acoustic wave may also be formed in the substrate.

In the acoustic flux produced by the transducer, the amplitude of the surface acoustic wave is small at the two sides of the flux and larger in the middle. The optical waveguide enters the acoustic flux at a point on one of the two sides, then moves into the center of the flux, and exits the flux at another point on one of the two sides, either the same side or the opposite side.

In another aspect of the invention, the optical wavelength filter has two transducers that produce two focused, intersecting acoustic beams. The optical waveguide crosses both beams from side to side as described above, at their point of intersection.

DETAILED DESCRIPTION OF THE INVENTION

Three embodiments of the invention, and several variations of these embodiments, will be described with reference to the attached illustrative drawings.

Figure 1:
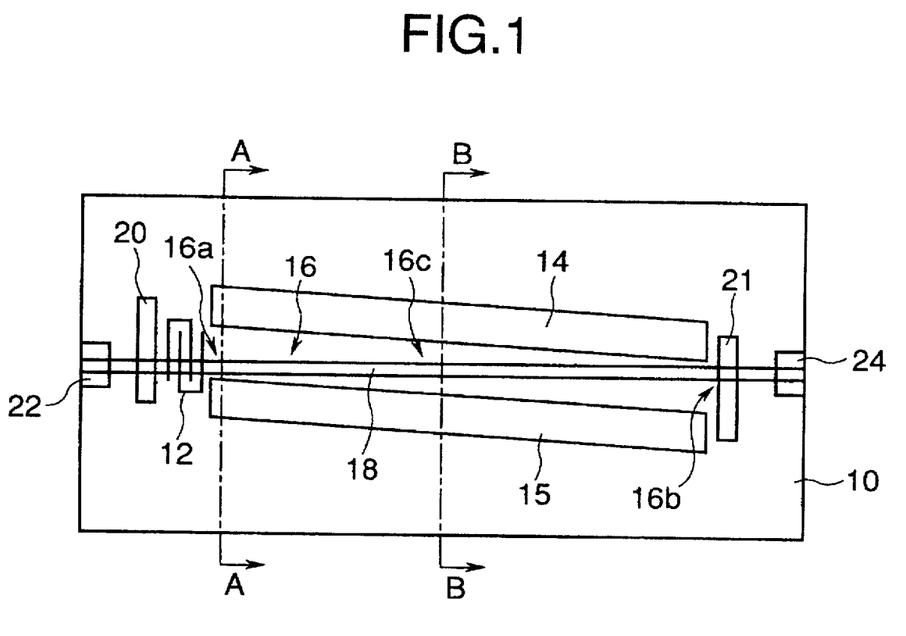
FIG. 1 is a plan view of a first embodiment of the invented optical wavelength filter.

The first embodiment, shown in FIG. 1, is an optical wavelength filter formed in an X-cut, Y-propagating lithium-niobate substrate 10 three centimeters long. Lithium niobate ($LiNbO_3$) is a well-known material displaying acoustic-optic effects.

An interdigital transducer 12 for exciting a surface acoustic wave is formed on the substrate 10. The transducer 12 comprises two comb-shaped electrodes with ten fingers apiece (the drawing shows only two of the ten fingers). The fingers are 100 µm long and are spaced at a 20-µm pitch.

A pair of barriers 14 and 15 are formed, e.g. by diffusion into the substrate 10 of an impurity that alters the speed of sound in the substrate 10. The diffusion may be either into the barriers 14 and 15 themselves, or into the area between them. The barriers 14 and 15 in this embodiment have straight, parallel sides. The area between the barriers 14 and 15 is a SAW waveguide 16. The speed of sound is higher in the barriers 14 and 15 than in the SAW waveguide 16. The front end 16a of the SAW waveguide 16 is located near the transducer 12.

An optical waveguide 18 is also formed by diffusion of an impurity into the substrate 10. The optical waveguide 18 in this embodiment has a straight-line configuration that is oriented at a non-zero angle to the longitudinal axis of the SAW waveguide 16. The optical waveguide 18 passes below the transducer 12, enters the front end 16a of the SAW waveguide 16 near barrier 15, and leaves the back end 16b of the SAW waveguide 16 near barrier 14. In the middle portion 16c of the SAW waveguide 16, the optical waveguide 18 is disposed centrally between the two barriers 14 and 15.

A SAW absorber 20 is provided behind the transducer 12 to absorb surface acoustic waves propagating away from the SAW waveguide 16. Another SAW absorber 21 is provided at the back end 16b of the SAW waveguide 16, to absorb surface acoustic waves leaving the SAW waveguide 16.

The optical waveguide 18 terminates at a polarizer 22 and analyzer 24. These are oriented so that they transmit light polarized in different directions. The polarizer 22 passes TE-mode light, which is polarized in a plane parallel to the plane of the substrate 10, while the analyzer 22 passes TM-mode light, which is polarized in a plane perpendicular to the plane of the substrate 10.

Figure 2:
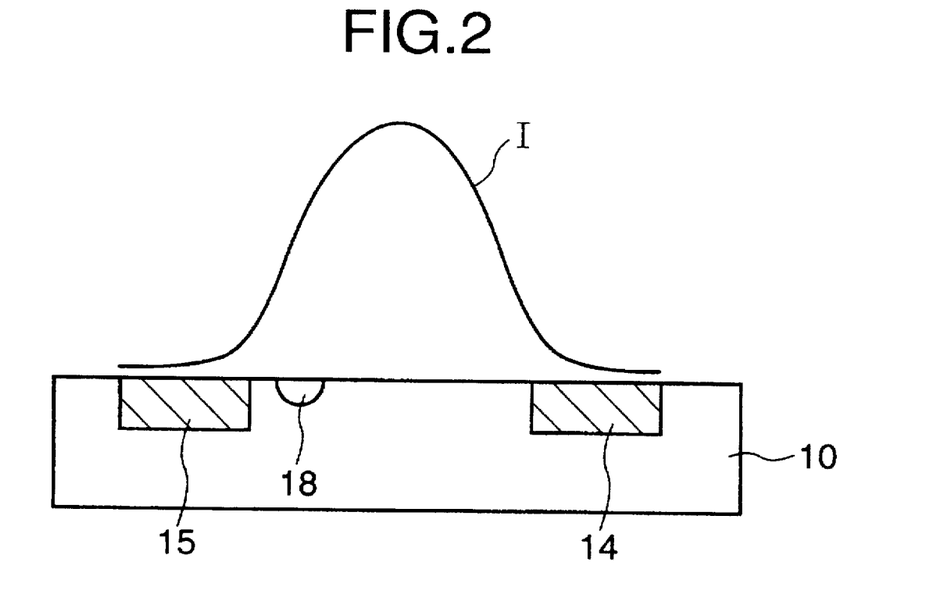
FIG. 2 is a graph of the SAW amplitude along line A—A in FIG. 1.

FIG. 2 is a graph of the SAW amplitude along the line A—A in FIG. 1, at the front end 16a of the SAW waveguide 16. The SAW amplitude is indicated by the height of a curve I above the substrate 10. The SAW amplitude starts at substantially zero in barrier 14, rises to a peak midway between barriers 14 and 15, then falls back to substantially zero in barrier 15. The acoustic power is proportional to the square of the SAW amplitude. Since the optical waveguide 18 is disposed near barrier 15, a comparatively small amount of acoustic power is coupled with the light in the optical waveguide 18, which is to say that the acousto-optic coupling coefficient is small at this point.

Figure 3:
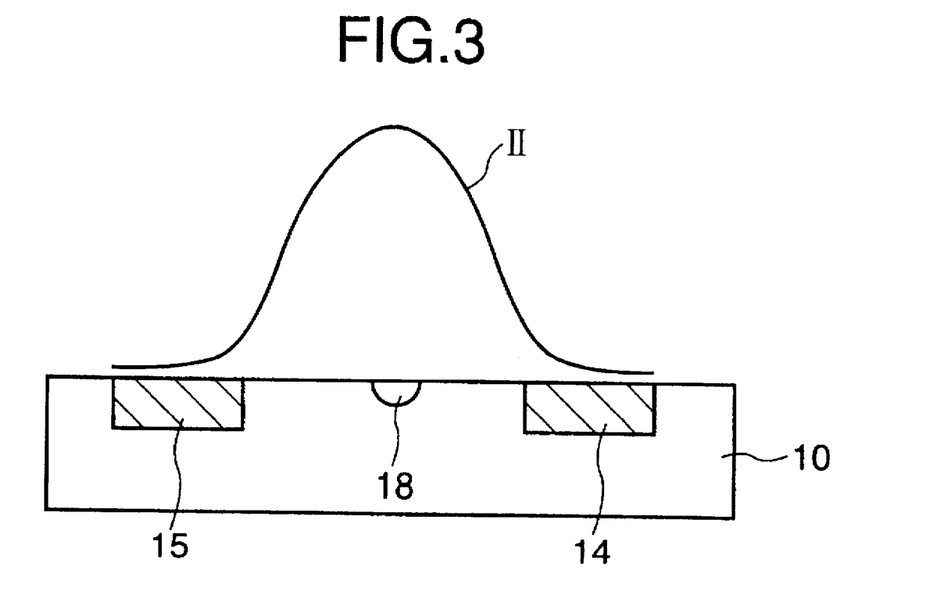
FIG. 3 is a graph of the SAW amplitude along line B—B in FIG. 1.

FIG. 3 is a graph of the SAW amplitude along the line B—B in FIG. 1, in the middle portion 16c of the SAW waveguide 16. The SAW amplitude is indicated by the height of a curve II, which has substantially the same profile as curve I in FIG. 2. Here the optical waveguide 18 is disposed midway between the barriers 14 and 15, so a comparatively large amount of acoustic power is coupled with the light in the optical waveguide 18.

The SAW amplitude profile at the back end 16b of the SAW waveguide 16 is similar to that in FIG. 2, with the optical waveguide 18 disposed near barrier 14. The acousto-optic coupling coefficient is small at both ends of the SAW waveguide 16 and larger in the middle.

Next, the operation of this optical wavelength filter will be explained.

The interdigital transducer 12 is electrically driven at a power of, for example, 13 dBm with a certain frequency, producing surface acoustic waves at this frequency. The surface acoustic waves travel through the SAW waveguide 16 from the front end 16a to the back end 16b, confined between the barriers 14 and 15 as indicated in FIGS. 2 and 3 because the speed of sound is higher in the barriers 14 and 15 than in the SAW waveguide 16.

Signal light is coupled into the optical waveguide 18 by the polarizer 22, and propagates into the SAW waveguide 16 in the TE mode. As the signal light travels down the SAW waveguide 16, interaction with the surface acoustic waves changes the polarization by an amount that depends on the optical wavelength and SAW frequency. For a certain wavelength of light, the polarization is converted from the TE mode at the front end 16a to the TM mode at the back end 16b. The SAW frequency can be selected so that light of a certain desired wavelength in the vicinity of 1.55 µm, for example, is converted from the TE mode to the TM mode. The analyzer 24 passes only light propagating in the TM mode, so it passes only the signal light of this desired wavelength.

Due to the SAW absorbers 20 and 21, interaction between the signal light and surface acoustic waves takes place mainly in the SAW waveguide 16. From FIGS. 1 to 3 it can be seen that as signal light propagates down the SAW waveguide 16, the acousto-optic coupling coefficient changes gradually from weak at the front end 16a to strong in the middle portion 16c, then back to weak again at the back end 16b.

As discussed earlier, this weighting of the coupling coefficient reduces sidelobes in the transmission characteristic of the filter. If the ratio of the acoustic power coupled with the signal light at the front end 16a (FIG. 2) to the acoustic power coupled in the middle portion 16c (FIG. 3) is about 1:3, for example, the sidelobe suppression ratio will be approximately 20 dB.

This favorable sidelobe suppression is moreover achieved with an extremely simple structure, employing a straight interdigital transducer 12 and straight waveguides. This makes the coupling coefficient and other filter parameters relatively easy to compute, and the filter easy to design.

Since the optical waveguide 18 passes under the transducer 12, it passes through a region where abrupt variation occurs in the coupling coefficient. The optical waveguide 18, however, passes through the side of this region, where the SAW amplitude is small to begin with, so the variation, although abrupt, is not large.

Variations of this first embodiment will be described next with reference to FIGS. 4 to 9. All of these variations operate in substantially the same way as the embodiment shown in FIG. 1, and offer the same advantages.

Figure 4:
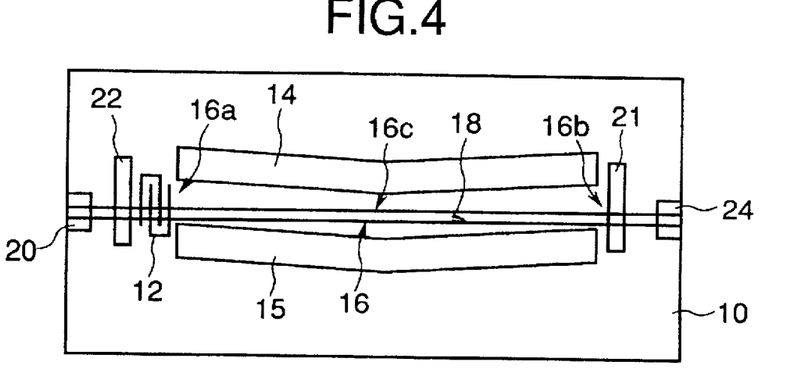
FIG. 4 illustrates a first variation of the optical wavelength filter shown in FIG. 1.

In the structure shown in FIG. 4, the barriers 14 and 15 are parallel but bent, so that the SAW waveguide 16 has a chevron shape. The optical waveguide 18 is straight. The optical waveguide 18 passes near barrier 15 at the front and back ends 16a and 16b of the SAW waveguide 16, and is disposed centrally between the barriers 14 and 15 in the middle portion 16c of the SAW waveguide 16.

Figure 5:
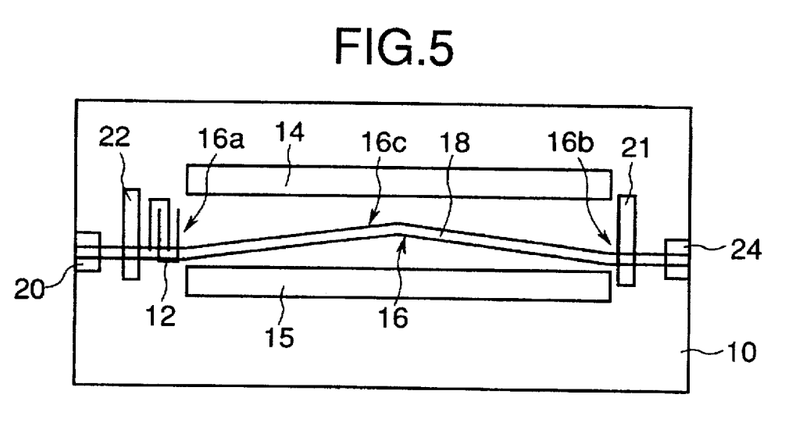
FIG. 5 illustrates a second variation of the optical wavelength filter shown in FIG. 1

In the structure shown in FIG. 5, the barriers 14 and 15 are straight, but the optical waveguide 18 is bent. As in the structure shown in FIG. 4, the optical waveguide 18 passes near barrier 15 at the front and back ends 16a and 16b of the SAW waveguide 16, and is disposed centrally between barriers 14 and 15 in the middle portion 16c.

Figure 6:
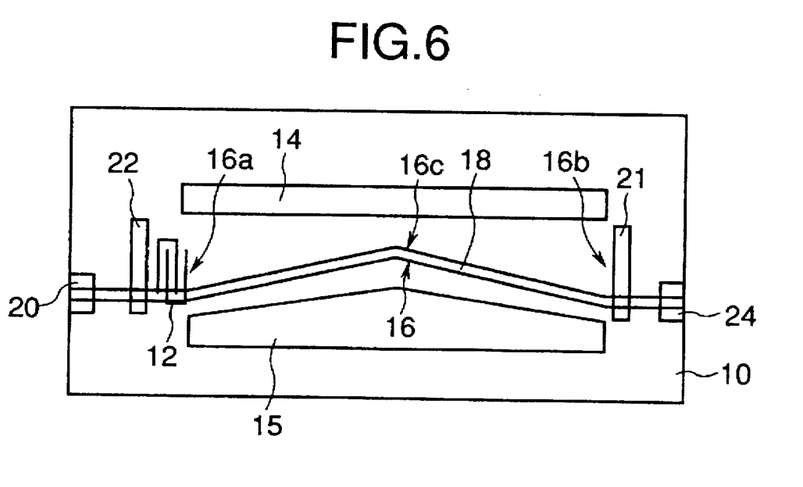
FIG. 6 illustrates a third variation of the optical wavelength filter shown in FIG. 1

In the structure shown in FIG. 6, barrier 14 is straight and barrier 15 is bent in a V-shape, so that it tapers away from barrier 14 at both ends. The optical waveguide 18 is similarly bent in the same direction as barrier 15. In the middle portion 16c of the SAW waveguide 16, the optical waveguide 18 is disposed centrally between the two barriers 14 and 15. At the front and back ends 16a and 16b, where the barriers 14 and 15 are farther apart, the optical waveguide 18 is relatively closer to barrier 15. This configuration also results in a coupling coefficient that is small at the front and back ends 16a and 16b and large in the middle portion 16c.

Figure 7:
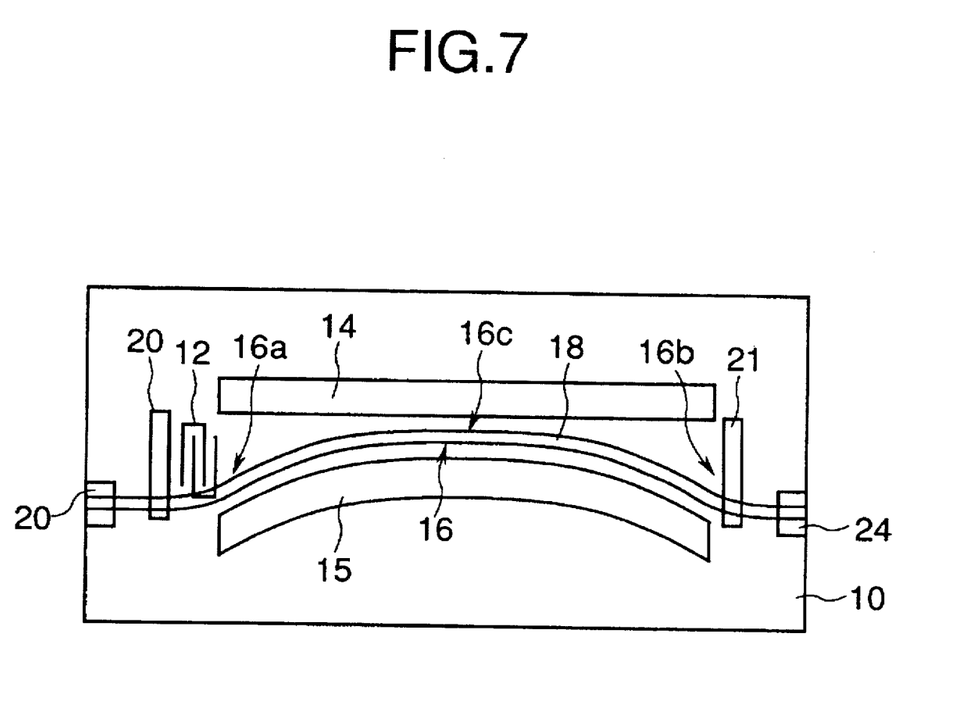
FIG. 7 illustrates a fourth variation of the optical wavelength filter shown in FIG. 1

The structure shown in FIG. 7 is similar to the structure shown in FIG. 6 in that the optical waveguide 18 and barrier 15 are parallel and bent, but the bend in the FIG. 7 structure is a smooth curve. As in the FIG. 6 structure, the optical waveguide 18 is disposed centrally between the two barriers 14 and 15 in the central portion 16c of the SAW waveguide 16, and is relatively closer to barrier 15 at the front and back ends 16a and 16b.

Figure 8:
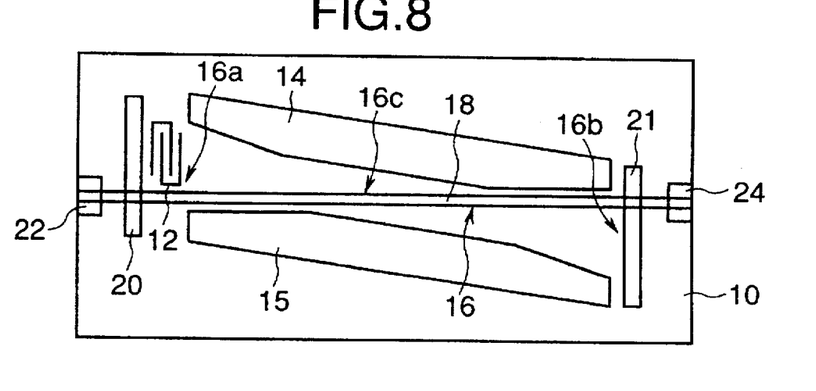
FIG. 8 illustrates a fifth variation of the optical wavelength filter shown in FIG. 1.

In the structure shown in FIG. 8, the barriers 14 and 15 are straight and parallel In the middle portion 16c of the SAW waveguide 16, but are tapered at the ends so that the SAW waveguide 16 widens at its front and back ends 16a and 16b. As in the FIG. 1 structure, the optical waveguide 18 is straight, and is disposed at an angle to the longitudinal axis of the SAW waveguide 16, passing near barrier 15 at the front end 16a and near barrier 14 at the back end 16b. A significant difference from the FIG. 1 structure is that the widening of the front end 16a of the SAW waveguide 16 permits the transducer 12 to be placed so that it is not directly over the optical waveguide 18. This leads to a further improvement in sidelobe suppression, as will be explained in more detail later.

Figure 9:
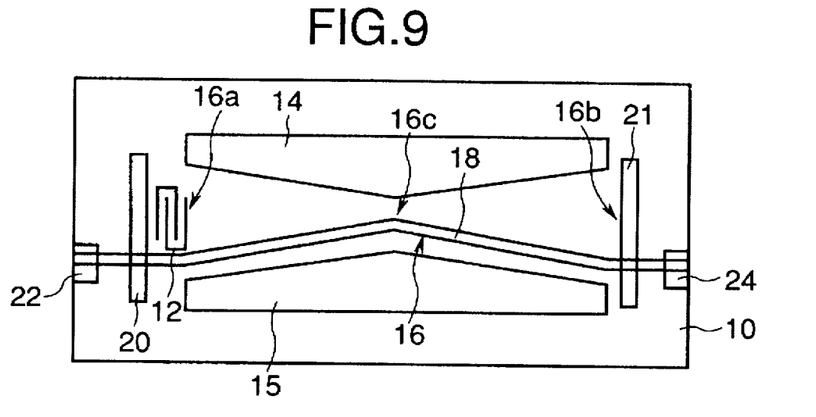
FIG. 9 illustrates a sixth variation of the optical wavelength filter shown in FIG. 1

In the structure shown in FIG. 9, the barriers 14 and 15 are both bent so that the distance between them is greater at the front and back ends 16a and 16b. The optical waveguide 18 parallels barrier 15. This configuration is generally similar to FIG. 6, except that the extra widening of the SAW waveguide 16 at the front end 16c again enables the transducer 12 to be placed so that it is not directly over the optical waveguide 18, thereby improving sidelobe suppression.

Figure 10:
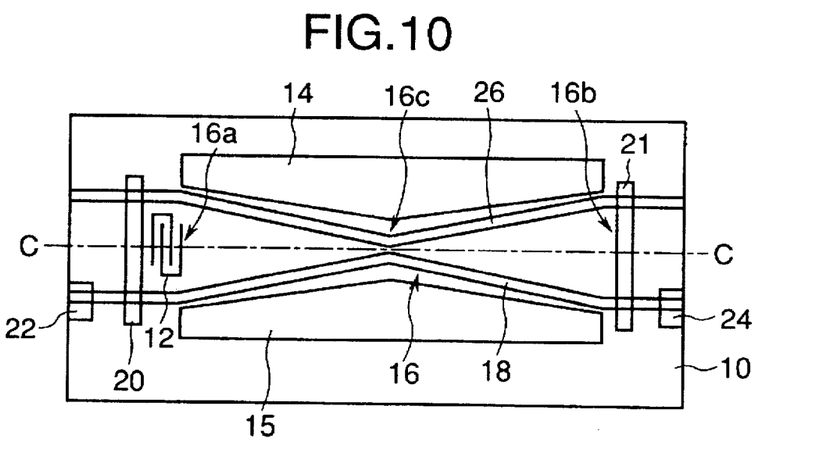
FIG. 10 illustrates a seventh variation of the optical wavelength filter shown in FIG. 1

In the structure shown in FIG. 10, a dummy waveguide 26 has been added to the structure shown in FIG. 9. The optical waveguide 18 and dummy waveguide 26 are disposed such that they are symmetrical about the longitudinal axis C—C of the SAW waveguide 16. The dummy waveguide 26 does not carry any signal information, but its presence makes the optical wavelength filter bilaterally symmetric, which further improves sidelobe suppression.

Next, a second embodiment of the invention will be described with reference to FIGS. 11 to 15.

Figure 11:
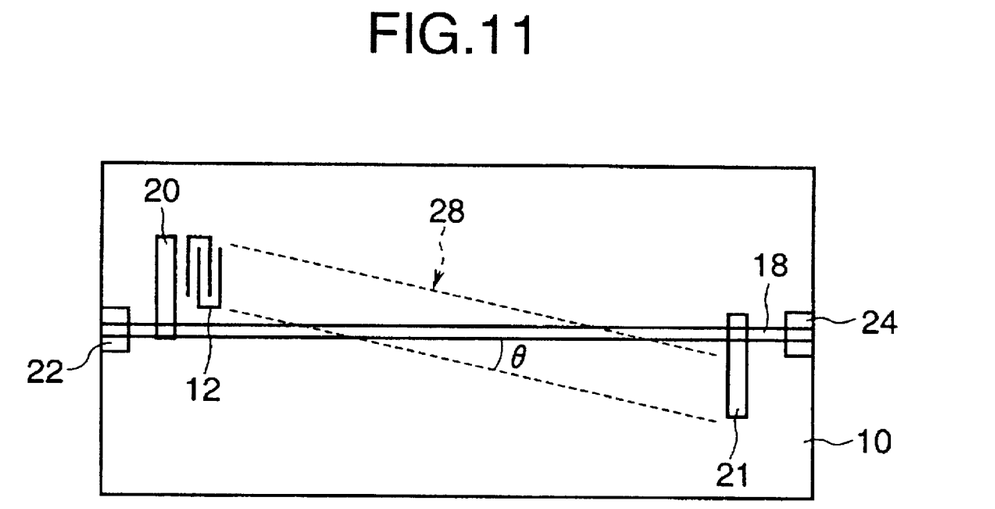
FIG. 11 is a plan view of a second embodiment of the invented optical wavelength filter.

Referring to FIG. 11, the second embodiment also comprises an X-cut, Y-propagating LiNbO$_3$ substrate 10 three centimeters long, with a transducer 12, an optical waveguide 18, SAW absorbers 20 and 21, a polarizer 22, and an analyzer 24, as in the first embodiment.

Although no SAW waveguide is provided in the second embodiment, the material properties of the LiNbO$_3$ substrate 10 cause the acoustic flux of the surface acoustic waves excited by the transducer 12 to propagate as a beam 28 at a 5° angle to the Y-axis of the substrate 10. The optical waveguide 18 is parallel to the Y-axis, so it cuts across the beam 28 at a 5° angle.

The SAW amplitude in the acoustic beam 28 has a profile similar to that shown by curves I and II in FIGS. 2 and 3, falling off from a maximum value in the center of a cross-section of the beam 28 to substantially zero at the edges of the beam.

Figure 12:
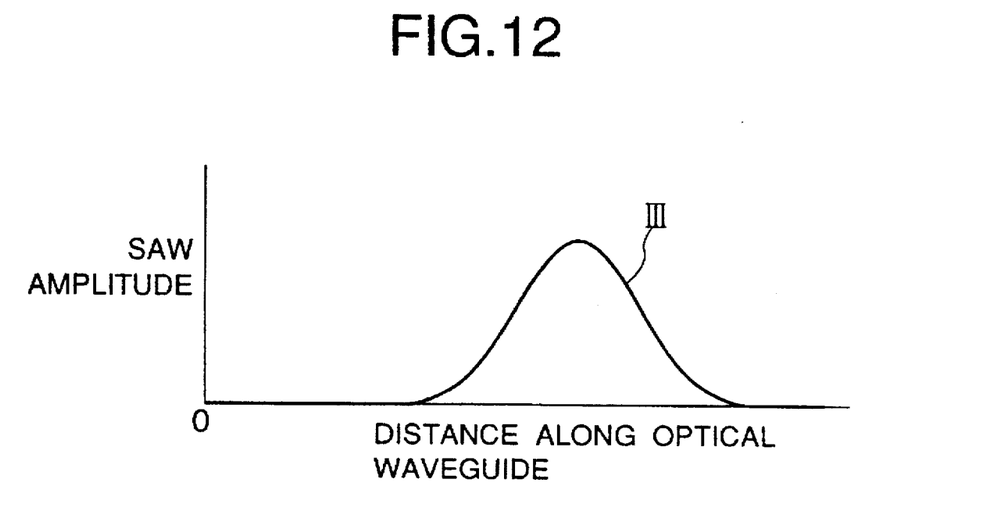
FIG. 12 is a graph of the SAW amplitude along the optical waveguide shown in FIG. 11.

FIG. 12 is a graph of the SAW amplitude at points over the optical waveguide 18 shown in FIG. 11. The horizontal axis indicates distance along the optical waveguide 18, while the SAW amplitude is indicated on the vertical axis. The SAW amplitude profile has the general shape of curve III, being substantially zero before the optical waveguide 18 enters the acoustic beam 28, beginning to rise smoothly where the optical waveguide 18 enters the acoustic beam 28, reaching a maximum value in the middle of the acoustic beam 28, then falling smoothly back to substantially zero where the optical waveguide 18 leaves the beam 28. The optical waveguide 18 does not pass under the transducer 12, and it moreover crosses the SAW absorbers 22 and 24 at points where acoustic flux is substantially absent. There are accordingly no abrupt changes in the SAW amplitude anywhere along the optical waveguide 18.

The coupling coefficient, which is proportional to the square of the SAW amplitude, shows a similarly smooth profile. The absence of abrupt changes in the coupling coefficient improves the sidelobe suppression ratio. The reason for this will be explained with reference to FIGS. 13 to 15.

Figure 13:
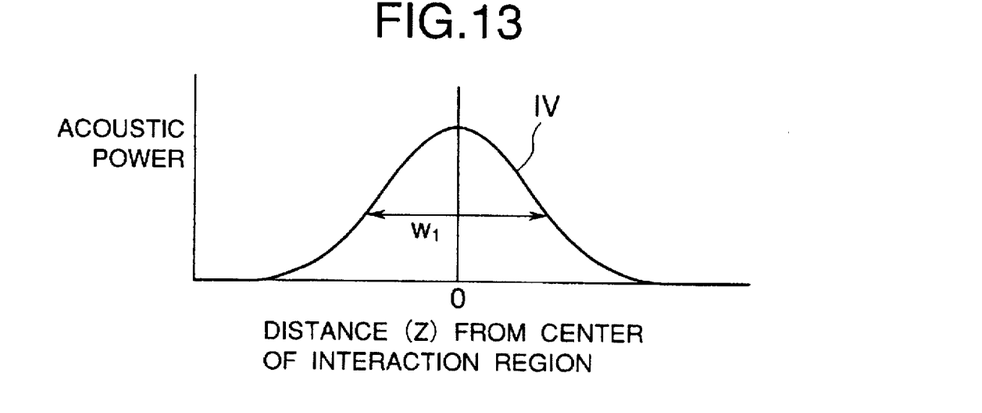
FIG. 13 is a graph of an ideal acoustic power distribution curve taken along the optical waveguide.

FIG. 13 shows an ideal distribution of acoustic power along the light propagation path in the optical wavelength filter. The horizontal axis indicates distance from the center of the filter (marked zero). Acoustic power is indicated on the vertical axis. The ideal distribution, indicated by curve IV, has a certain half-power width $w_1$.

Figure 14:
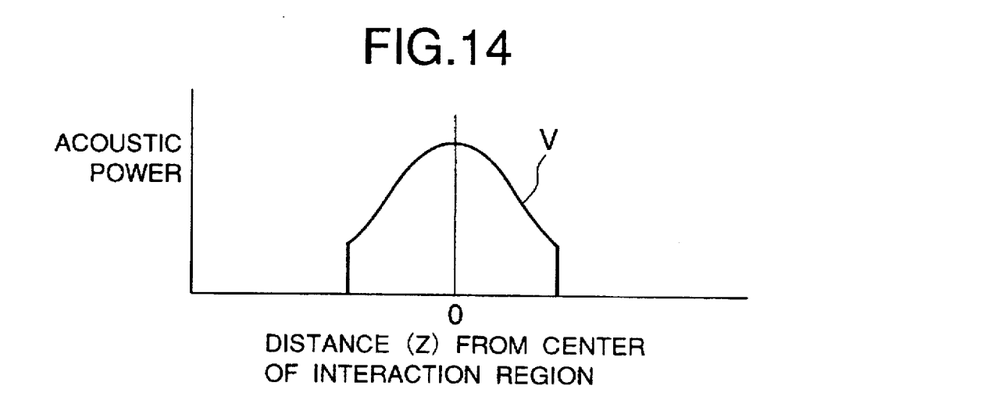
FIG. 14 is a graph of the acoustic power distribution curve taken along the optical waveguide of a conventional optical wavelength filter.

FIG. 14 shows the situation in a hypothetical optical wavelength filter shown in which the acoustic power is ideally distributed, except that the optical waveguide enters and leaves the interaction region at points where the acoustic power is not zero. The horizontal and vertical axes have the same meaning as in FIG. 13. The curve V of the acoustic power distribution along the light propagation path is a truncated version of the curve IV in FIG. 13, falling abruptly to zero where light enters and leaves the interaction region.

Figure 15:
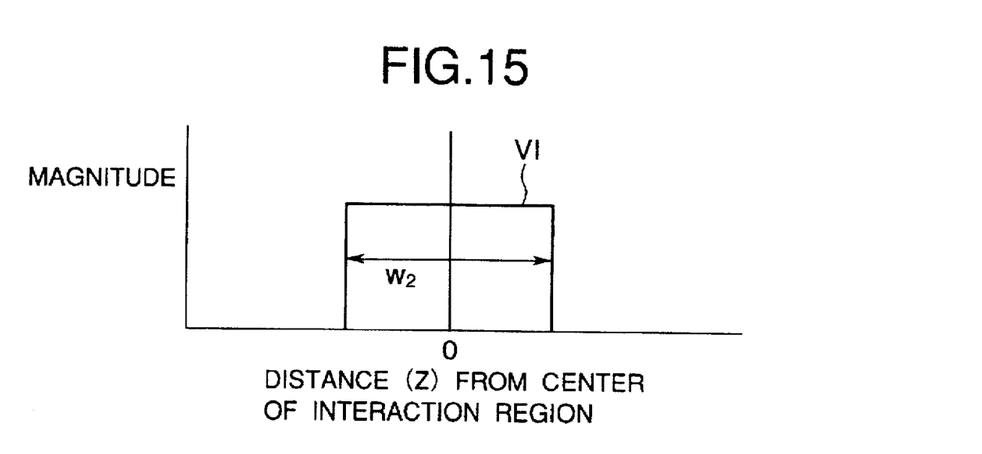
FIG. 15 is a graph of a window function.

FIG. 15 shows a window function of the interaction region. The horizontal axis has the same meaning as in FIG. 13; the vertical axis is a dimensionless quantity indicating the magnitude of the window function. Curve VI (the window function) has unit height over the interaction region and is zero elsewhere. The distance, measured along the light propagation path, between the two ends of the interaction region is $w_2$.

If z represents distance along the light propagation path, P(z) is the ideal acoustic power distribution shown in FIG. 13, and W(z) is the window function shown in FIG. 15, then the acoustic power distribution in FIG. 14 represents the product W(z)P(z). The wavelength transmission characteristic of an optical wavelength filter is obtained as the Fourier transform of the acoustic power distribution. For FIG. 14, the transmission characteristic T(λ) can be expressed as follows:

$$T(\lambda) \int W(z)P(z)\exp(-i\delta z)dz$$

In this equation $\delta = \Delta\beta/2 - \pi/\Lambda$, $\Delta\beta = 2\pi\Delta n/\lambda$, Λ is the SAW wavelength, and Δn is the birefringence index of the optical waveguide. If ^W(λ) is the Fourier transform of W(z) and ^P(λ) is the Fourier transform of P(z), the above equation implies that T(λ) is proportional to the convolution of ^W(λ) and ^P(λ):

$$T(\lambda) \text{^W}(\lambda) * \text{^P}(\lambda)$$

The Fourier transform of a window function has intrinsic sidelobes. If the width $w_2$ of the window function W(z) is equal to the half-power width $w_1$ of the acoustic power distribution P(z), meaning that the ratio of peak acoustic power to the power at the edges of the interaction region is 2:1, these intrinsic sidelobes of ^W(λ) set a limit of about 9 dB on sidelobe suppression in the wavelength transmission characteristic T(λ). Filter designs that make the optical waveguide 18 pass directly under the center of the transducer 12 encounter a limit of this type.

Moving the optical waveguide 18 out from under the transducer 12 has the effect of narrowing the half-power width $w_1$ in FIG. 13. This is equivalent to leaving $w_1$ constant and increasing the width $w_2$ of the window function W(z) in FIG. 15. If $w_2$ is widened, the Fourier transform ^W(λ) of W(z) becomes more like a delta function, permitting sidelobe suppression to be improved.

If the ratio of peak acoustic power to power at the edges of the interaction region is 10:3.2, for example, then sidelobe suppression can be improved to about 15 dB. If the ratio is 10:1, sidelobe suppression can be improved to about 25 dB. This value indicates that satisfactory sidelobe suppression can be attained even if the actual SAW amplitude profile along the optical waveguide 18 does not fall completely to zero as shown in FIG. 12.

As a variation of the second embodiment, a SAW waveguide can be added to confine the acoustic beam 28 to a well-defined path, thereby obtaining a larger coupling coefficient at the center of the beam 28. The resulting device configuration is the same as shown in FIG. 8.

The inventive concept of locating the transducer and optical waveguide away from one another, to avoid abrupt changes in the coupling coefficient below the transducer 12, can also be applied to optical wavelength filters with curved transducers. This will be illustrated as a third embodiment of the invention.

Figure 16:
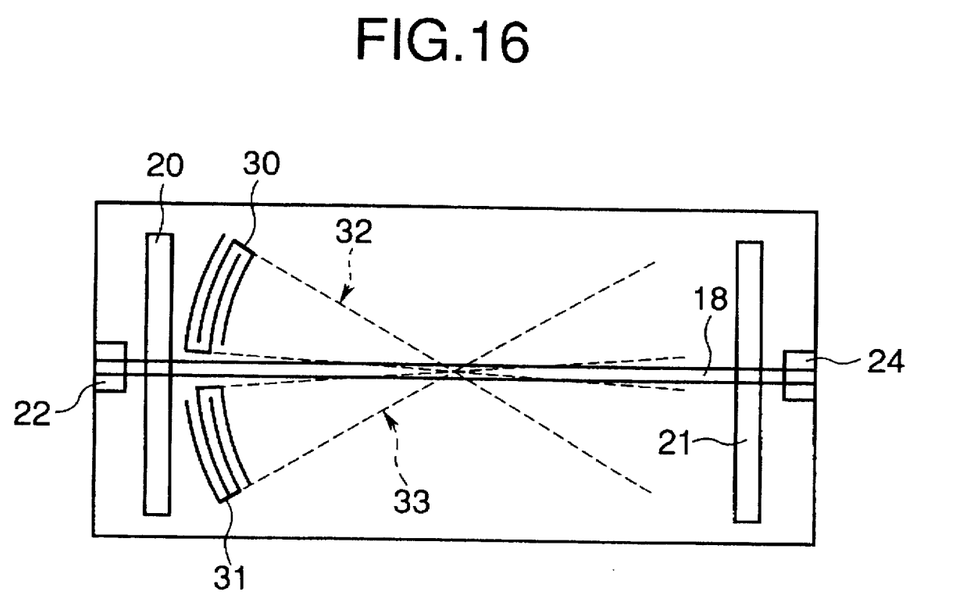
FIG. 16 is a plan view of a third embodiment of the invented optical wavelength filter.

Referring to FIG. 16, the third embodiment has a pair of curved interdigital transducers 30 and 31, each having the form of a circular arc and both having the same radius of curvature. The optical waveguide 18 passes between these two transducers 30 and 31, so that it is disposed below neither of them. The polarizer 22, analyzer 24, and SAW absorbers 20 and 21 are arranged as in the first embodiment in FIG. 1.

The surface acoustic waves excited by transducer 30 are focused in a beam 32 toward the middle of the optical waveguide 18. The surface acoustic waves excited by transducer 31 are focused in a beam 33 toward the same point. The optical waveguide 18 crosses both beams 32 and 33 in the vicinity of their point of intersection.

The third embodiment operates in essentially the same way as the second embodiment. The focusing of the acoustic beams can improve the weighting of the coupling coefficient, e.g. by creating a higher peak value at the middle of the optical waveguide 18. The curvature of the transducers can be adjusted to achieve the desired weighting function. The bilateral symmetry of the acoustic beam 32 and 33 in the third embodiment leads to improved sidelobe suppression.

As a variation of the third embodiment, one of the two transducers 30 and 31 can be omitted, so that the optical waveguide 18 crosses only one focused beam, from one side of the beam to the other.

As another variation of the third embodiment, the two transducers 30 and 31 can be straight, like the transducer 12 shown in FIG. 11. Each transducer actually produces two beams, which propagate at angles of +5° and −5° to the Y-axis, so that there are four beams in all. Two of these beams cross the optical waveguide 18; the other two beams are not used.

FIGS. 1 to 15 are drawn schematically, for the purpose of showing in a readily understandable way how the invention works. The invention is not restricted to the exact sizes, shapes, or positional relationships of the elements shown in these drawings, or to the materials mentioned in the description. The polarizer 22 and analyzer 24 need not be integral with the substrate 10. The invention can moreover employ SAW waveguides of various types other than the diffused type shown in FIGS. 1 to 3.

Mode conversion is not restricted to TE-to-TM conversion. The opposite type of conversion, from TM mode to TE mode, can be employed, for example.

Those skilled in the art will recognize that further modifications can also be made without departing from the scope claimed below.

What is claimed is:

1. An optical wavelength filter, comprising:

a polarizer for passing light of a particular polarization;

an analyzer for passing light of another particular polarization;

a substrate;

a transducer formed on said substrate, for exciting a surface acoustic wave;

a SAW waveguide including a pair of bent longitudinal barriers formed in said substrate, said SAW waveguide having a longitudinal axis disposed between said barriers, a first end disposed near said transducer, a second end, and a middle portion disposed between said first end and said second end, for guiding the surface acoustic wave from said first end to said second end, wherein said SAW waveguide is bilaterally symmetrical about said longitudinal axis;

an optical waveguide formed in said substrate and bent in a same direction as a first of said barriers without passing under said transducer, for guiding light from said polarizer through said SAW waveguide to said analyzer, said optical waveguide being disposed near said first of said barriers at said first end, disposed centrally between said barriers in said middle portion of said SAW waveguide, and disposed near said first of said barriers at said second end; and a dummy waveguide bent in the same direction as a second of said barriers, said optical waveguide and said dummy waveguide being symmetrical to one another about said longitudinal axis.

2. An optical wavelength filter, comprising:

a polarizer for passing light of a particular polarization;

an analyzer for passing light of another particular polarization;

a substrate;

an optical waveguide for guiding light from said polarizer to said analyzer; and a first transducer formed on said substrate to one side of said optical waveguide and not overlying said optical waveguide, for exciting a surface acoustic wave, thereby creating a first acoustic beam that crosses said optical waveguide, without the use of a SAW waveguide or barrier, so that the first acoustic beam interacts with the light with a certain coupling coefficient which varies along said optical waveguide according to a certain weighting function, wherein said first transducer is formed along a circular ac having a certain radius of curvature.

3. An optical wavelength filter, comprising;

a polarizer for passing light of a particular polarization;

an analyzer for passing light of another particular polarization;

a substrate;

an optical waveguide for guiding light from said polarizer to said analyzer;

a first transducer formed on said substrate to one side of said optical waveguide and not overlying said optical waveguide, for exciting a surface acoustic wave thereby creating a first acoustic beam that crosses said optical waveguide, without the use of a SAW waveguide or barrier, so that the first acoustic beam interacts with the light with a certain coupling coefficient which varies along said optical waveguide according to a certain weighting function; and a second transducer formed on said substrate on another side of said optical waveguide without overlying said optical waveguide, for creating a second acoustic beam that is symmetrical to the first acoustic beam about said optical waveguide.

4. The optical wavelength filter of claim 3, wherein said first transducer and said second transducer are straight.

5. The optical wavelength filter of claim 3, wherein said first transducer and said second transducer are formed along circular arcs with identical radii of curvature.

6. An optical wavelength filter, comprising:

a polarizer for passing light of a particular polarization;

an analyzer for passing light of another particular polarization;

a substrate;

an optical waveguide for guiding light from said polarizer to said analyzer; and a first transducer formed as a circular arc with a certain radius of curvature on said substrate to one side of said optical waveguide and not overlying said optical waveguide, for exciting a surface acoustic wave, thereby creating a first acoustic beam that crosses said optical waveguide so that the first acoustic beam interacts with the light with a certain coupling coefficient which varies according to a certain weighting function along said optical waveguide.

7. The optical wavelength filter of claim 6, also comprising a second transducer formed on said substrate on another side of said optical waveguide and not overlying said optical waveguide, for creating a second acoustic beam that is symmetrical to the first acoustic beam about said optical waveguide.

8. The optical wavelength filter of claim 7, wherein said first transducer and said second transducer are straight.

9. The optical wavelength filter of claim 7, wherein said first transducer and said second transducer are formed as circular arcs with identical radii of curvature.

\* \* \* \* \*